(12) United States Patent
Vilca et al.

(10) Patent No.: US 12,617,386 B2
(45) Date of Patent: May 5, 2026

(54) CONTROL SYSTEM FOR CONTROLLING A RETARDATION OF A VEHICLE

(71) Applicant: Volvo Truck Corporation, Gothenburg (SE)

(72) Inventors: José Vilca, Gothenburg (SE); Esteban Gelso, Gothenburg (SE); Leo Laine, Härryda (SE); Mikael Askerdal, Åsa (SE); Mats Jonasson, Partille (SE); Sachin Janardhanan, Hisings Kärra (SE)

(73) Assignee: Volvo Truck Corporation, Gothenburg (SE)

( * ) Notice: Subject to any disclaimer, the term of this patent is extended or adjusted under 35 U.S.C. 154(b) by 54 days.

(21) Appl. No.: 18/846,172

(22) PCT Filed: Mar. 17, 2022

(86) PCT No.: PCT/EP2022/057050
§ 371 (c)(1),
(2) Date: Sep. 11, 2024

(87) PCT Pub. No.: WO2023/174547
PCT Pub. Date: Sep. 21, 2023

(65) Prior Publication Data
US 2025/0187581 A1 Jun. 12, 2025

(51) Int. Cl.
*B60W 10/184* (2012.01)
*B60R 16/023* (2006.01)
(Continued)

(52) U.S. Cl.
CPC ....... *B60W 10/184* (2013.01); *B60R 16/0236* (2013.01); *B60W 10/08* (2013.01); *B60W 30/18109* (2013.01)

(58) Field of Classification Search
CPC ............. B60W 10/184; B60W 10/192; B60W 30/18109; B60W 2510/087;
(Continued)

(56) References Cited

U.S. PATENT DOCUMENTS 9,751,517 B2 * 9/2017 Choi ............... B60W 30/18127
2005/0130796 A1 * 6/2005 Loeffler ................... B60T 1/10
477/4
(Continued)

OTHER PUBLICATIONS

International Search Report and Written Opinion for International Patent Application No. PCT/EP2022/057050, mailed Nov. 18, 2022, 12 pages.

*Primary Examiner* — George C Jin
(74) *Attorney, Agent, or Firm* — Withrow & Terranova, PLLC

(57) ABSTRACT

A control system for controlling a retardation of a vehicle. The control system is adapted to use power loss information for each motion support device controlling the retardation of the vehicle. For each one of the motion support devices, the power loss information is such that, for each one of a plurality of operating points, the power loss information comprises a power loss value indicative of a power loss of the motion support device when operated at the operating point, each operating point being related to at least a load produced by the motion support device.

16 Claims, 4 Drawing Sheets

(51) Int. Cl.
  *B60W 10/08*          (2006.01)
  *B60W 30/18*          (2012.01)
(58) Field of Classification Search
  CPC ..... B60W 2510/184; B60W 2510/244; B60W
                      2540/12; B60R 16/0236
  See application file for complete search history.

(56)                    References Cited

U.S. PATENT DOCUMENTS

| | | | |
|---|---|---|---|
| 2010/0138117 A1* | 6/2010 | Witte | B60L 3/108 |
| | | | 903/947 |
| 2015/0266466 A1* | 9/2015 | Johri | B60W 30/188 |
| | | | 180/65.265 |
| 2018/0178776 A1 | 6/2018 | Kuwahara et al. | |
| 2020/0391724 A1 | 12/2020 | Shidore et al. | |
| 2022/0097534 A1* | 3/2022 | Zhang | B60W 30/18 |
| 2022/0194233 A1* | 6/2022 | Reuter | B60L 7/10 |

* cited by examiner

CONTROL SYSTEM FOR CONTROLLING A RETARDATION OF A VEHICLE

This application is a 35 USC 371 national phase filing of International Application No. PCT/EP2022/057050, filed Mar. 17, 2022, the disclosure of which is incorporated herein by reference in its entirety.

TECHNICAL FIELD

The invention relates to a control system for controlling a retardation of a vehicle. Moreover, the present invention relates to a vehicle. Additionally, the present invention relates to a method for controlling a retardation of a vehicle.

The invention can be applied in heavy-duty vehicles, such as trucks, buses and construction equipment. Although the invention will be described with respect to a truck, the invention is not restricted to this particular vehicle, but may also be used in other vehicles such as busses, haulers and other types of vehicles.

BACKGROUND

A contemporary vehicle may comprise a plurality of motion support devices for controlling the propulsion of the vehicle. At least one of the motion support devices may be an electric motor and another motion support device may be a service brake. The motion support devices may be controlled in order to arrive at a desired state of the vehicle, such as a desired positive acceleration or a negative acceleration. Such a negative acceleration may also be referred to as a retardation.

For instance, according to its abstract, US2005/0130796 A1 discloses a method for controlling a hybrid drive of a vehicle. The hybrid drive includes as propulsion motors an internal combustion engine and at least one electric motor/generator, and the output shafts of the propulsion motors being operatively linkable to a power train of the vehicle. The propulsion motors and an electrically activatable braking system of the vehicle are activated in a coordinated manner as a function of a negative load request, taking this negative load request into account.

However, there is still a need for further improvements as regards the control of a vehicle, for instance when retarding a vehicle.

SUMMARY

An object of the invention is to provide a control system by which a vehicle can be retarded in an energy efficient manner.

According to a first aspect of the invention, the object is achieved by a control system according to claim 1.

As such, the present invention relates to a control system for controlling a retardation of a vehicle.

The vehicle comprises a set of motion support devices for controlling the retardation of the vehicle. At least a first motion support device in the set of motion support devices is an electric motor and at least a second motion support device in the set of motion support devices is a service brake. The vehicle comprises a set of wheels whereby each motion support device in the set of motion support devices is drivingly connected, directly or indirectly, to one or more of the wheels.

The control system is adapted to use power loss information for each motion support device in the set of motion support devices. For each one of the motion support devices, the power loss information is such that, for each one of a plurality of operating points, the power loss information comprises a power loss value indicative of a power loss of the motion support device when operated at the operating point, each operating point being related to at least a load produced by the motion support device.

According to the invention, the control system is adapted to:

receive a vehicle retardation request indicative of a requested retardation of the vehicle;

use the power loss information for each motion support device in the set of motion support devices in order to determine a brake load to be supplied by each motion support device in the set of motion support devices such that the aggregated brake load supplied by the set of motion support devices results in a retardation of the vehicle corresponding to the vehicle retardation request, and issue information to the set of motion support devices indicative of the brake load to be supplied by each motion support device in the set of set of motion support devices.

As such, the control system of the present invention uses power loss information for each motion support device, including the at least one motion support device being a service brake, when determining the brake load to be supplied by each motion support device. This in turns implies that the set of motion support devices may be controlled such that an appropriately low total power loss may be arrived at when retarding a vehicle.

To this end, the inventors of the present invention have realized that using also the power loss information for the second motion support device being a service brake when determining a brake load to be supplied by each motion support device in the set of motion support devices may result in that load distributions amongst the motion support devices may be arrived at which may result in lower total power losses as compared to control units employing a control strategy in which e.g. only the power losses amongst the electric motors and/or internal combustion engines are considered when determining a load distribution.

As used herein, the term "power loss" of a motion support device is intended to encompass power generated by a motion support device which cannot be reused but goes to waste. As a non-limiting example, power loss may relate to heat generated by a motion support device.

Optionally, the control system is adapted to use the power loss information for each motion support device in the set of motion support devices in order to determine a brake load to be supplied by each motion support device in the set of motion support devices such that the aggregated brake load supplied by the set of motion support devices results in a retardation of the vehicle corresponding to the vehicle retardation request and such that the aggregated power loss from the set of motion support devices is equal to or lower than an aggregated power loss threshold associated with the vehicle retardation request.

Optionally, the control system is adapted to use the power loss information for each motion support device in the set of motion support devices in order to determine a brake load to be supplied by each motion support device in the set of motion support devices such that the aggregated brake load supplied by the set of motion support devices results in a retardation of the vehicle corresponding to the vehicle retardation request and such that an absolute value of the difference between the aggregated power loss from the set of motion support devices and a minimum value of the aggregated power losses associated with the vehicle retardation request is equal to or below a predetermined difference threshold. Preferably the aggregated power loss from the set of motion support devices corresponds to the minimum amount of the aggregated power losses associated with the vehicle retardation request.

The above implies that a brake load to be supplied by each motion support device may be determined which results in appropriately low aggregated power losses.

Optionally, the control system comprises a memory adapted to store the power loss information for each motion support device in the set of motion support devices.

Optionally, for the power loss information for at least one, preferably each one, of the motion support devices in the set of motion support devices, each operating point is related to at least a load produced by the motion support device as well as information indicative of a rotational speed of a wheel connected to the motion support device.

Optionally, the first motion support device in the set of motion support devices is an electric motor connected to an energy storage device and for the power loss information for the first motion support device, each operating point is related to at least a load produced by the motion support device as well as information indicative of current state of charge associated with the energy storage device and/or a current maximum charging rate associated with the energy storage device.

Optionally, for each one of the motion support devices, each operating point is related to at least a load produced by the motion support device as well as information indicative of a current temperature of at least a portion of the motion support device.

Optionally, the load produced by each motion support device is one of the following: a force and a torque.

A second aspect of the present invention relates to a vehicle comprising a set of motion support devices for controlling the retardation of the vehicle. At least a first motion support device in the set of motion support devices is an electric motor and at least a second motion support device in the set of motion support devices is a service brake. The vehicle comprises a set of wheels whereby each motion support device in the set of motion support devices being drivingly connected, directly or indirectly, to one or more of the wheels, the vehicle comprising a control system according to any one of the preceding claims.

A third aspect of the present invention relates to a method for controlling a retardation of a vehicle.

The vehicle comprises a set of motion support devices for controlling the retardation of the vehicle. At least a first motion support device in the set of motion support devices is an electric motor and at least a second motion support device in the set of motion support devices is a service brake. The vehicle comprises a set of wheels whereby each motion support device in the set of motion support devices is drivingly connected, directly or indirectly, to one or more of the wheels.

The method comprises using power loss information for each motion support device in the set of motion support devices.

For each one of the motion support devices, the power loss information is such that, for each one of a plurality of operating points, the power loss information comprises a power loss value indicative of a power loss of the motion support device when operated at the operating point, each operating point being related to at least a load produced by the motion support device.

The method according to the third aspect of the present invention comprises:

receiving a vehicle retardation request indicative of a requested retardation of the vehicle;

using the power loss information for each motion support device in the set of motion support devices in order to determine a brake load to be supplied by each motion support device in the set of motion support devices such that the aggregated brake load supplied by the set of motion support devices results in a retardation of the vehicle corresponding to the vehicle retardation request, and issuing information to the set of motion support devices indicative of the brake load to be supplied by each motion support device in the set of set of motion support devices.

Optionally, the method comprises using the power loss information for each motion support device in the set of motion support devices in order to determine a brake load to be supplied by each motion support device in the set of motion support devices such that the aggregated brake load supplied by the set of motion support devices results in a retardation of the vehicle corresponding to the vehicle retardation request and such that the aggregated power loss from the set of motion support devices is equal to or lower than an aggregated power loss threshold associated with the vehicle retardation request.

Optionally, the method comprises using the power loss information for each motion support device in the set of motion support devices in order to determine a brake load to be supplied by each motion support device in the set of motion support devices such that the aggregated brake load supplied by the set of motion support devices results in a retardation of the vehicle corresponding to the vehicle retardation request and such that an absolute value of the difference between the aggregated power loss from the set of motion support devices and a minimum value of the aggregated power losses associated with the vehicle retardation request is equal to or below a predetermined difference threshold. Preferably, the aggregated power loss from the set of motion support devices corresponds to the minimum amount of the aggregated power losses associated with the vehicle retardation request.

Optionally, for the power loss information for at least one, preferably each one, of the motion support devices in the set of motion support devices, each operating point is related to at least a load produced by the motion support device as well as information indicative of a rotational speed of a wheel connected to the motion support device.

Optionally, the first motion support device in the set of motion support devices is an electric motor connected to an energy storage device and for the power loss information for the first motion support device, each operating point is related to at least a load produced by the motion support device as well as information indicative of current state of charge associated with the energy storage device and/or a current maximum charging rate associated with the energy storage device.

Optionally, for each one of the motion support devices, each operating point is related to at least a load produced by the motion support device as well as information indicative of a current temperature of at least a portion of the motion support device.

Optionally, the load produced by each motion support device is one of the following: a force and a torque.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
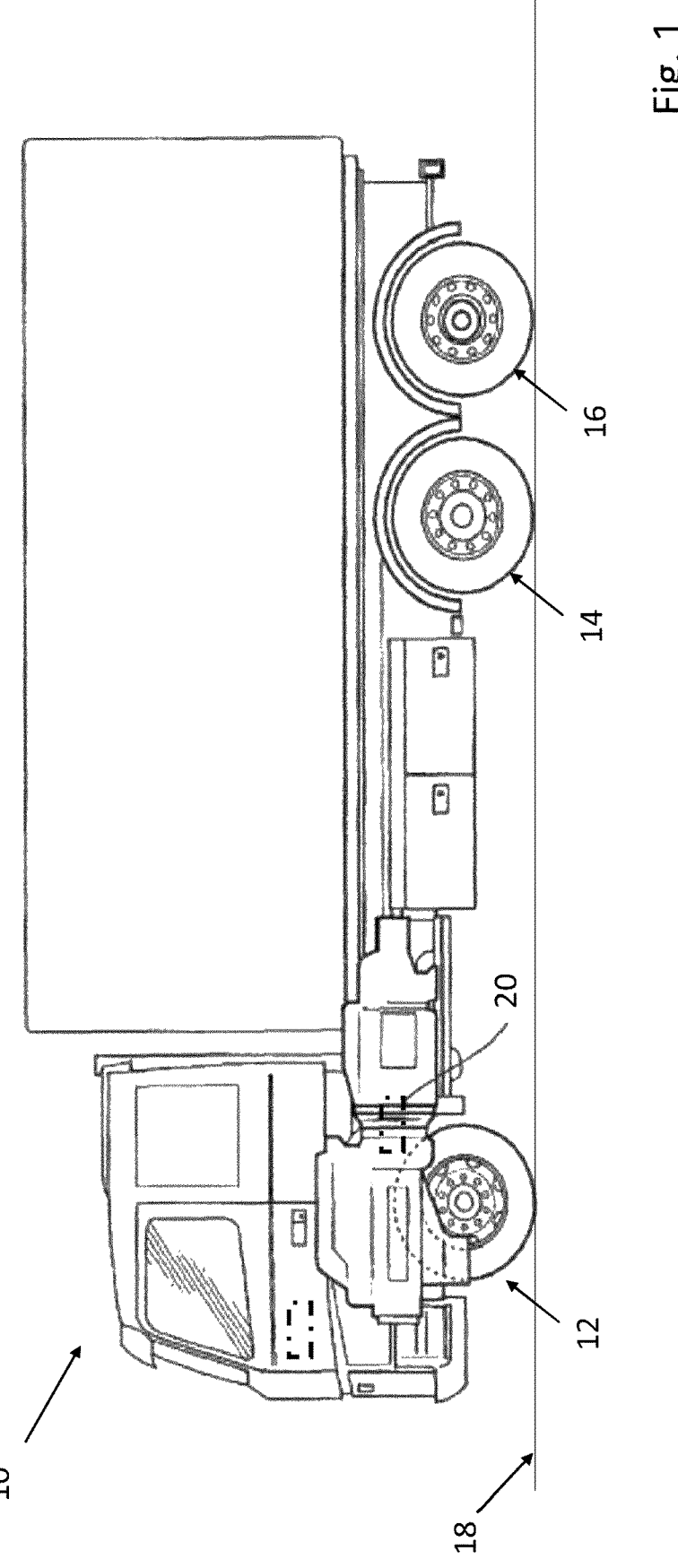
FIG. 1 is a side view of a vehicle according to an embodiment of the present invention.

FIG. 1 is a side view of a vehicle 10 according to the present invention. In FIG. 1, the vehicle 10 is exemplified as a truck. However, it is also envisaged that the vehicle 10 according to the present invention may be another type of vehicle, such as a bus (not shown).

As may be gleaned from FIG. 1, the vehicle 10 comprises a plurality of wheels 12, 14, 16, each one of which being adapted to contact a ground surface 18.

Figure 2:
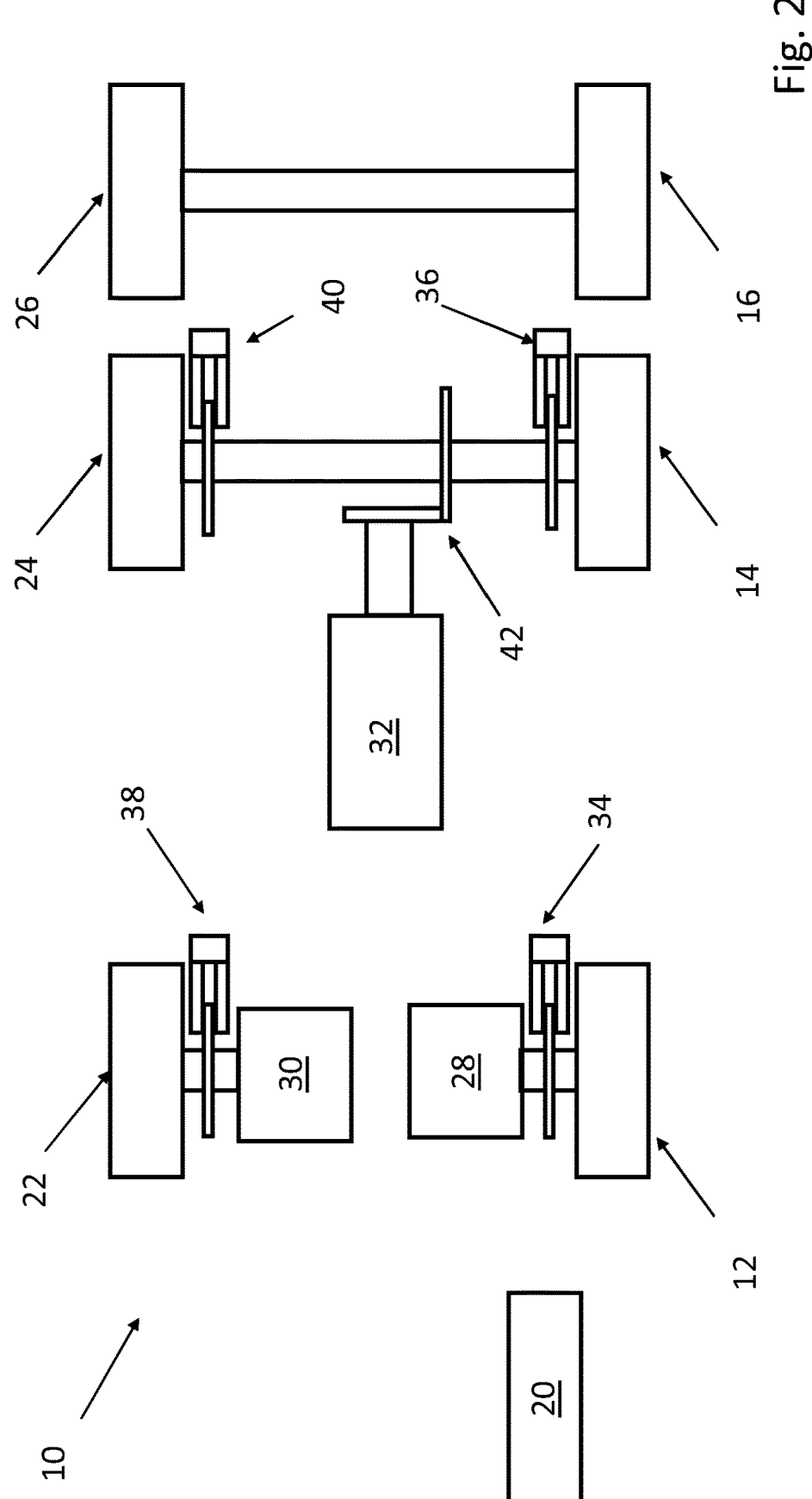
FIG. 2 is a schematic top view of a vehicle.

FIG. 2 is a schematic top view of a portion of a vehicle 10, such as the FIG. 1 vehicle 10. As may be gleaned from FIG. 2, the vehicle 10 may comprise a plurality of wheels 12, 14, 16, 22, 24, 26.

Moreover, FIG. 2 illustrates that the vehicle 10 may comprise a set of motion support devices 28, 30, 32, 34, 36, 38, 40 for controlling the retardation of the vehicle 10.

At least a first motion support device 28, 30, 32 in the set of motion support devices is an electric motor and at least a second motion support device 34, 36, 38, 40 in the set of motion support is a service brake. The set of motion support devices illustrated in FIG. 2 comprises three electric motors 28, 30, 32 and four service brakes 34, 36, 38, 40.

Moreover, as indicated in FIG. 2, the vehicle 10 comprises a set of wheels 12, 14, 16, 22, 24, 26 whereby each motion support device 28, 30, 32, 34, 36, 38, 40 in the set of motion support devices is drivingly connected, directly or indirectly, to one or more of the wheels 12, 14, 16, 22, 24, 26. As intimated above and as indicated in FIG. 2, the vehicle 10 comprises a control system 20.

As indicated in FIG. 2, a motion support device 28, 30, 32 may be an electric motor that is connected to a single wheel, see e.g. each one of the leftmost electric motor containing motion support devices 28, 30 in FIG. 2. Alternatively, a motion support device 28, 30, 32 may be an electric motor that is connected to a two or more wheels, see e.g. the rightmost electric motor containing motion support device 32 in FIG. 2. Purely by way of example, and as indicated in FIG. 2, an electric motor may be connected to two wheels 14, 24 via a final gearing 42.

The control system 20 is adapted to control a retardation of a vehicle 10. To this end, the control system is adapted to issue information to each one of the motion support devices 28, 30, 32, 34, 36, 38, 40. Purely by way of example, the control system 20 may be connected, wirelessly or via one or more cables (not shown) or the like, to each one of the motion support devices 28, 30, 32, 34, 36, 38, 40. However, it is also envisaged that the control system 20 and the motion support devices 28, 30, 32, 34, 36, 38, 40 may communicate via a CAN bus system (not shown) or a similar communication system.

The control system 20 of the present invention will now be discussed. It should be noted that the below presentation of the control system is equally applicable to the method of the present invention.

As indicated above, control system 20 is adapted to control a retardation of a vehicle 10. The control system 20 may be adapted to perform additional tasks as well, such as to control the propulsion of the vehicle 10 in other operating conditions, but emphasis is here put on the retardation control.

The control system 20 is adapted to use power loss information for each motion support device 28, 30, 32, 34, 36, 38, 40 in the set of motion support devices. For each one of the motion support devices 28, 30, 32, 34, 36, 38, 40, the power loss information is such that, for each one of a plurality of operating points, the power loss information comprises a power loss value indicative of a power loss of the motion support device when operated at the operating point, each operating point being related to at least a load produced by the motion support device.

Purely by way of example, the load produced by each motion support device may be one of the following: a force and a torque. In the below description, torque T is used as an example of the load. However, it should be noted that other embodiments of the present invention may use a force as the load produced by each motion support device.

Figure 3:
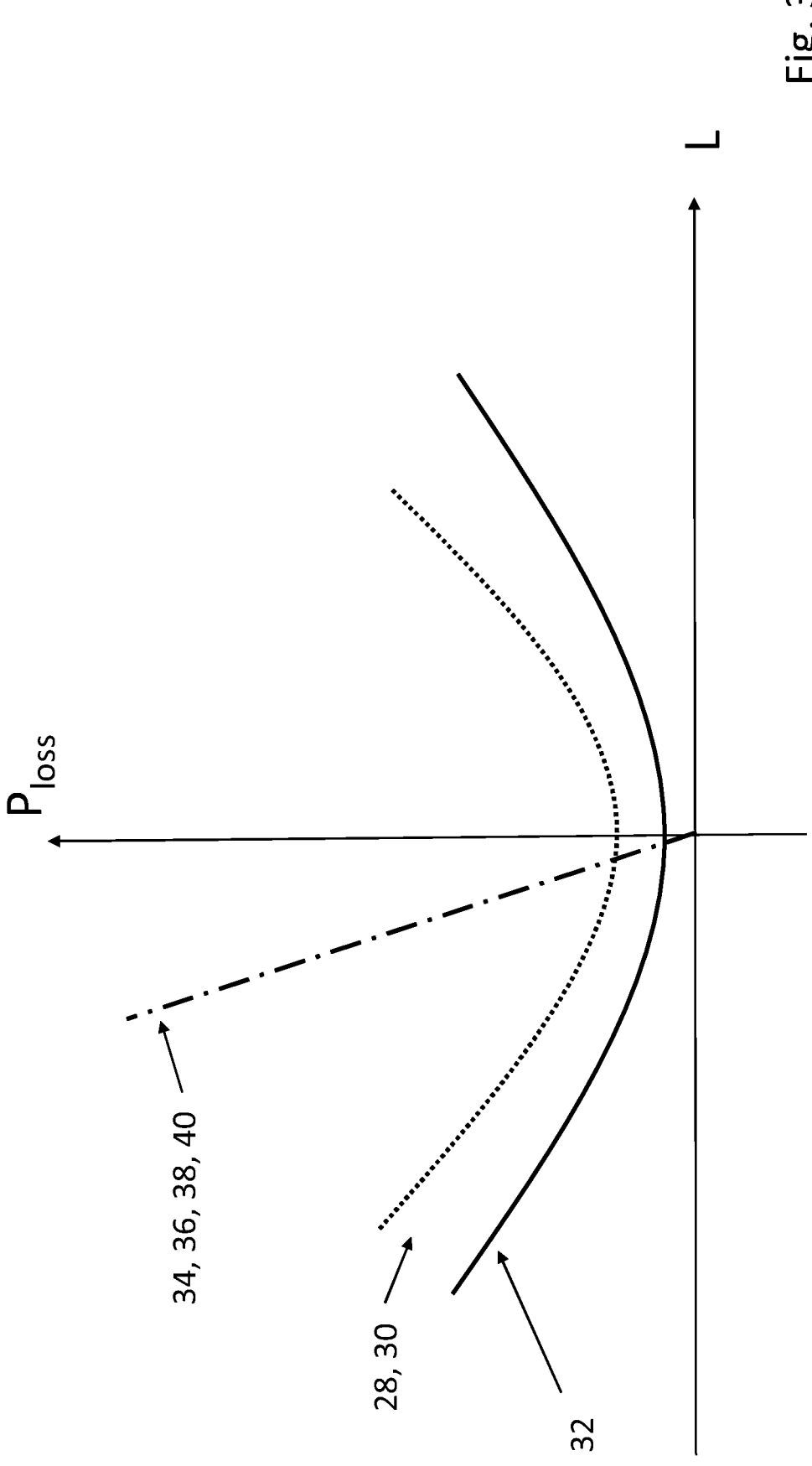
FIG. 3 is a graph illustrating examples of power loss information for different motion support devices.

To this end, reference is made to FIG. 3 with a graph illustrating examples of power loss information for different motion support devices 28, 32, 34. In the FIG. 3 graph, the abscissa indicates a load value L, for instance a torque T, and the ordinate indicates a power loss value $P_{loss}$. As non-limiting examples, the load value L, for instance when exemplified as a torque T, may be expressed in Nm and the power loss value $P_{loss}$ may be expressed in kW. However, it is of course envisaged that other entities and/or units may be used for the load value L and the power loss value $P_{loss}$, respectively. For instance, the load value L may be a force expressed in N.

To this end, the solid line in FIG. 3 may be indicative of power loss information associated with a motion support device adapted for supplying cruising propulsion power to the vehicle 10, e.g. by propelling a cruising axle of a vehicle 10. Such a motion support device may for instance be an electric motor. Using the FIG. 2 embodiment of the vehicle 10 as an example, the solid line in FIG. 3 may be indicative of power loss information associated with the rightmost electric motor 32 in FIG. 2.

Moreover, the dotted line in FIG. 3 may be indicative of power loss information associated with a motion support device adapted for supplying starting propulsion power to the vehicle 10, e.g. by propelling start axle of a vehicle 10. Such a motion support device may for instance be an electric motor. Using the FIG. 2 embodiment of the vehicle 10 as an example, the dotted line in FIG. 3 may be indicative of power loss information associated with any one of the leftmost electric motors 28, 30 in FIG. 2.

Additionally, the dashed and dotted line in FIG. 3 may be indicative of power loss information associated with a motion support device being a service brake of a vehicle 10. Using the FIG. 2 embodiment of the vehicle 10 as an example, the dashed and dotted line in FIG. 3 may be indicative of power loss information associated with any one of the service brakes 34, 36, 38, 40 in FIG. 2.

As may be realized from the above, for many operating points, in particular operating points with a high magnitude of the absolute value of the load L, the power loss associated with a motion support device being a service brake of a vehicle 10 may be higher than the power loss associated with a motion support device being for instance an electric motor. Moreover, as indicated in FIG. 3, the power loss associated with a motion support device being a service brake of a vehicle 10 may for instance be modelled as a linear function of the load L, such as the torque T.

However, for relatively small magnitudes of the load L, the power loss associated with a motion support device being a service brake of a vehicle 10 may actually be lower than the power loss associated with at least one motion support device being an electric motor of the vehicle. As such, for relatively low brake loads, using a service brake instead of an electric motor for imparting a wheel or wheels a braking load may actually be beneficial form a power loss point of view. Consequently, a procedure for identifying how much brake load to be supplied by each motion support device in said set of motion support devices so as to arrive at a certain aggregated brake load may thus be facilitated if the power loss information for each motion support device 28, 30, 32, 34, 36, 38, 40 also includes power loss information for at least one service brake of the vehicle.

For the sake of simplicity, the FIG. 3 graph only presents the power loss $P_{loss}$ as a function of the load L. However, it is also envisaged that the $P_{loss}$ may be a function of additional parameters.

To this end, though purely by way of example, for the power loss information for at least one, preferably each one, of the motion support devices 28, 30, 32, 34, 36, 38, 40 in the set of motion support devices, each operating point is related to at least a load L produced by the motion support device as well as information indicative of a rotational speed w of a wheel 12, 14, 16, 22, 24, 26 connected to the motion support device 28, 30, 32, 34, 36, 38, 40.

Instead of, or in addition to the above, the first motion support device 28, 30, 32 in the set of motion support devices is an electric motor connected to an energy storage device (not shown), such as a battery (not shown), and for the power loss information for the first motion support device, each operating point is related to at least a load L produced by the motion support device as well as information indicative of current state of charge associated with the energy storage device and/or a current maximum charging rate associated with the energy storage device.

Here, it should be noted that if the current state of charge associated with the energy storage device indicates that the energy storage device cannot be charged further to any large extent, this would be an indication that the first motion support device 28, 30, 32 cannot be used for regenerative braking producing electric power for charging the energy storage device. Instead, the first motion support device 28, 30, 32 may in such a situation have to be operated in a condition producing a retarding load at relatively high power losses, e.g. high thermal losses. As such, the solid line curve or the dotted line curve in FIG. 3 may be indicative of significantly higher power loss values for a condition in which the first motion support device 28, 30, 32 concerned is prevented from carrying out regenerative braking producing electric power for charging an energy storage device.

The above reasoning applies mutatis mutandis to the current maximum charging rate associated with the energy storage device.

Moreover, though purely by way of example, for each one of the motion support devices 28, 30, 32, 34, 36, 38, 40, each operating point may be related to at least a load produced by the motion support device as well as information indicative of a current temperature of at least a portion of the motion support device.

As may be realized from the above, the power loss information for the motion support devices 28, 30, 32, 34, 36, 38, 40 may be dependent on a plurality of parameters in addition to the load L produced by the motion support device 28, 30, 32, 34, 36, 38, 40.

For the sake of completeness, it should be noted that it is envisaged that motion support devices 28, 30, 32, 34, 36, 38, 40 in a set of motion support devices need not necessarily be associated with power loss information being dependent on the same set of parameters. On the contrary, it is envisaged that in embodiments of the control unit 20, the power loss information for one motion support device 28 in a set of motion support devices may be dependent on each one of first set of parameters and another one motion support device 30 in a set of motion support devices may be dependent on each one of second set of parameters.

Moreover, for the sake of simplicity, the FIG. 3 graph illustrates the power loss $P_{loss}$ as a function of the load L for various motion support devices 28, 30, 32, 34, 36, 38, 40 wherein the power loss information for one motion support device is independent of the power loss information on the other motion support devices. However, it is also envisaged that in embodiments of the invention, the power loss information for one motion support device may be dependent on conditions, such as the power loss information, of one or more of the other motion support devices in the set of motion support devices.

However, irrespective of on how many parameters the power loss information is dependent, the power loss information for each motion support device 28, 30, 32, 34, 36, 38, 40 may be determined using computer simulations, physical models, model tests etcetera. Of course, power loss information may be determined using any combination the above examples.

Moreover, the power loss information is preferably stored in a memory (not shown) of the control system 20. As such, though purely by way of example, the control system 20 may comprise a memory adapted to store the power loss information for each motion support device 28, 30, 32, 34, 36, 38, 40 in the set of motion support devices.

In addition to the above, the control system 20 is adapted to receive a vehicle retardation request indicative of a requested retardation of the vehicle. Purely by way of example, such a vehicle retardation request may be received from an actuator, such as a brake pedal (not shown), operable by an operator of the vehicle. Alternatively, the vehicle retardation request may be received from an autonomous driving system (not shown).

To this end, the control system 20 may be adapted to receive a vehicle retardation request in terms of a requested retardation, such as a requested retardation expressed in $m/s^2$, and the control unit 20 may be adapted to use information indicative of the vehicle 10 and the vehicle's 10 current operating condition, such as the mass of the vehicle 10 as well as the inclination of the ground surface 18 on which the vehicle 10 is currently travelling on or is predicted to be travelling on, and therefrom determine an aggregated brake load $L_{tot}$ supplied by the set of motion support devices 28, 30, 32, 34, 36, 38, 40 which results in a retardation of the vehicle 10 corresponding to the vehicle retardation request. Purely by way of example, the aggregated brake load $L_{tot}$ may be an aggregated brake torque Ttot or an aggregated brake force $F_{tot}$.

However, as a non-limiting alternative, the control system 20 may be adapted to receive a vehicle retardation request in terms of an aggregated brake load request $L_{tot}$. Thus, the vehicle 10 may comprise another control unit (not shown) adapted to convert a retardation request into an aggregated brake load $L_{tot}$.

Irrespective of the form of the vehicle retardation request, the control system 20 is adapted to use the power loss information for each motion support device 28, 30, 32, 34, 36, 38, 40 in the set of motion support devices in order to determine a brake load, e.g. a brake force or a brake torque, to be supplied by each motion support device 28, 30, 32, 34, 36, 38, 40 in the set of motion support devices such that the aggregated brake load $L_{tot}$ supplied by the set of motion support devices results in a retardation of the vehicle 10 corresponding to the vehicle retardation request.

As such, if a brake load is denoted by $L_i$ and the power loss is denoted by $P_{loss,i}$ for the i:th motion support device in the set of motion support devices, the power loss as a function of the brake load $L_i$ may be formulated in accordance with the following: $P_{loss,i}$ ($L_i$). As such, the control system 20 is generally adapted to determine a brake load $L_i$ to be supplied by each motion support device 28, 30, 32, 34, 36, 38, 40 such that the aggregated brake load $L_{tot}$ is obtained in accordance with the following:

$$\sum_{i=1}^{n} L_i = L_{tot} \qquad \text{Eq. 1}$$

where n is the number of motion support devices in the set of motion support devices. For the sake of completeness, it should be noted that the above feature to determine a brake load $L_i$ to be supplied by each motion support device 28, 30, 32, 34, 36, 38, 40 such that the aggregated brake load $L_{tot}$ is arrived at may in practice be implemented by ensuring that the difference between the sum of the brake loads $L_i$ and the aggregated brake load $L_{tot}$ is less than a certain load threshold $L_{thres}$, for instance in accordance with any one of the following examples:

$$-L_{thres} \leq \sum_{i=1}^{n} L_i - L_{tot} \leq L_{thres} \qquad \text{Eq. 2}$$

$$\left| \sum_{i=1}^{n} L_i - L_{tot} \right| \leq L_{thres} \qquad \text{Eq. 3}$$

For the sake of completeness, it should be noted that the load threshold $L_{thres}$ need not necessarily be a fixed value but may for instance be dependent on the magnitude of the aggregated brake load $L_{tot}$. Purely by way of example, the load threshold $L_{thres}$ may be defined as a percentage of the aggregated brake load $L_{tot}$ in accordance with the following: $L_{thres} = KL_{tot}$, where k is a factor between 0 and 1, for instance between 0 and 0.05.

The power loss information for each motion support device 28, 30, 32, 34, 36, 38, 40 can be used in a plurality of different ways when determining the brake load $L_i$ to be supplied by each motion support device 28, 30, 32, 34, 36, 38, 40.

To this end, though purely by way of example, the control system 10 may be adapted to use the power loss information $P_{loss,i}$ for each motion support device 28, 30, 32, 34, 36, 38, 40 in the set of motion support devices in order to determine a brake load $L_i$ to be supplied by each motion support device 28, 30, 32, 34, 36, 38, 40 in the set of motion support devices such that the aggregated brake load $L_{tot}$ supplied by the set of motion support devices results in a retardation of the vehicle 10 corresponding to the vehicle retardation request and such that the aggregated power loss from the set of motion support devices is equal to or lower than an aggregated power loss threshold $P_{loss,tot,thres}$ associated with the vehicle retardation request. The above can be formulated in accordance with the following:

$$\begin{cases} \sum_{i=1}^{n} L_i = L_{tot} \\ \sum_{i=1}^{n} P_{loss,i}(L_i) \leq P_{loss,tot,thres} \end{cases} \qquad \text{Eq. 4}$$

The above equation system may be solved in a plurality of different ways. Purely by way of example, it may be possible to select different combinations of brake load $L_i$ to be supplied by each motion support device 28, 30, 32, 34, 36, 38, 40 and assess whether or not the selected combination meets the conditions stipulated by Eq. 4 hereinabove. To this end, it may be possible to use a heuristic method, viz a method based on certain simplified assumptions as regards the brake loads and associated power losses, and to perform an iteration over the brake loads $L_i$ until the Eq. 4 criteria are met. As another non-limiting example, a machine learning procedure may be employed for identifying brake loads $L_i$ meeting the Eq. 4 criteria.

As another non-limiting example, the control system 20 may be adapted to use the power loss information $P_{loss,i}$ for each motion support device 28, 30, 32, 34, 36, 38, 40 in the set of motion support devices in order to determine a brake load $L_i$ to be supplied by each motion support device 28, 30, 32, 34, 36, 38, 40 in the set of motion support devices such that the aggregated brake load $L_{tot}$ supplied by the set of motion support devices results in a retardation of the vehicle 10 corresponding to the vehicle retardation request and such that an absolute value of the difference between the aggregated power loss from the set of motion support devices and a minimum value $P_{loss,tot,min}$ of the aggregated power losses associated with the vehicle retardation request is equal to or below a predetermined difference threshold $\Delta P_{thres}$. An implementation of the above is presented below:

$$\begin{cases} \sum_{i=1}^{n} L_i = L_{tot} \\ \left| \sum_{i=1}^{n} P_{loss,i}(L_i) - P_{loss,tot,min} \right| \leq \Delta P_{thres} \end{cases} \qquad \text{Eq. 5}$$

Brake loads $L_i$ meeting the criteria of Eq. 5 may also be identified using a heuristic method and/or a machine learning procedure as has been mentioned hereinabove. Brake loads $L_i$ meeting the criteria of Eq. 5 may also be identified using a minimization or optimization routine that attempts to minimize the aggregated power loss from the set of motion support devices under the boundary condition that the sum of the brake loads $L_i$ equals, or substantially equals as indicated in Eq. 2 or Eq. 3 hereinabove, the aggregated brake load $L_{tot}$.

As such, though again purely by way of example, the brake loads $L_i$ may be determined using a minimization problem such as the one presented in Eq. 6 below, i.e. a minimization problem in which the aggregated power loss from the set of motion support devices corresponds to the minimum amount of the aggregated power losses associated with the vehicle retardation request.

$$\begin{cases} \sum_{i=1}^{n} L_i = L_{tot} \\ \min_{L_1 \ \dots \ L_n} \left( \sum_{i\_1}^{n} P_{loss,i}(L_i) \right) \end{cases} \qquad \text{Eq. 6}$$

It should be noted that it may not be needed to identify the brake loads $L_i$ resulting in the smallest possible aggregated power loss. Instead, a minimization procedure implementing Eq. 6 for instance may be stopped before the smallest possible aggregated power loss is arrived at. For instance, should the minimization procedure be an iterative process, such process may be stopped when the difference, e.g. in terms of the aggregated power loss from the set of motion support devices, between two subsequent iterations are deemed to be appropriately low, for instance below a pre-determined iteration threshold.

Irrespective of how the brake loads $L_i$ have been identified, the control system 20 is adapted to issue information to the set of motion support devices indicative of the brake load $L_i$ to be supplied by each motion support device 28, 30, 32, 34, 36, 38, 40 in the set of set of motion support devices.

As has been intimated hereinabove, the above presentation of the control system is equally applicable to the method of the present invention. However, for the sake of completeness, FIG. 4 illustrates a flow chart of an embodiment of a method for controlling a retardation of a vehicle 10.

The vehicle 10 comprises a set of motion support devices for controlling the retardation of the vehicle 10. At least a first motion support device 28, 30, 32 in the set of motion support devices being an electric motor and at least a second motion support device 34, 36, 38, 40 in the set of motion support devices being a service brake. The vehicle 10 comprises a set of wheels 12, 14, 16, 22, 24, 26 whereby each motion support device in the set of motion support devices is drivingly connected, directly or indirectly, to one or more of the wheels 12, 14, 16, 22, 24, 26. The method comprises using power loss information for each motion support device 28, 30, 32, 34, 36, 38, 40 in the set of motion support devices, For each one of the motion support devices 28, 30, 32, 34, 36, 38, 40, the power loss information is such that, for each one of a plurality of operating points, the power loss information comprises a power loss value indicative of a power loss of the motion support device 28, 30, 32, 34, 36, 38, 40 when operated at the operating point, each operating point being related to at least a load produced by the motion support device 28, 30, 32, 34, 36, 38, 40.

Figure 4:
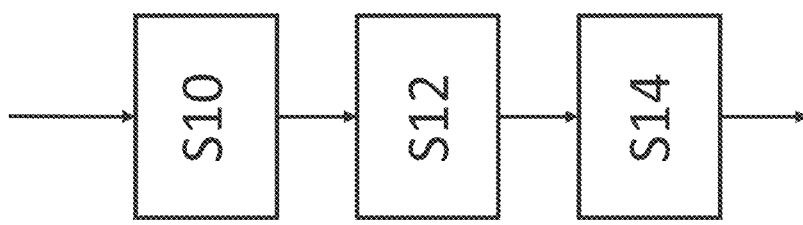
FIG. 4 is a flowchart illustrating an embodiment of the method of the present invention.

With reference to the FIG. 4 flowchart, the method comprises:

S10: receiving a vehicle 10 retardation request indicative of a requested retardation of the vehicle 10;

S12: using the power loss information for each motion support device 28, 30, 32, 34, 36, 38, 40 in the set of motion support devices in order to determine a brake load $L_i$ to be supplied by each motion support device 28, 30, 32, 34, 36, 38, 40 in the set of motion support devices such that the aggregated brake load $L_i$ supplied by the set of motion support devices results in a retardation of the vehicle 10 corresponding to the vehicle 10 retardation request, and S14: issuing information to the set of motion support devices indicative of the brake load $L_i$ to be supplied by each motion support device 28, 30, 32, 34, 36, 38, 40 in the set of set of motion support devices.

It is to be understood that the present invention is not limited to the embodiments described above and illustrated in the drawings; rather, the skilled person will recognize that many changes and modifications may be made within the scope of the appended claims.

The invention claimed is:

1. A control system for controlling a retardation of a vehicle;

the vehicle comprising a set of motion support devices for controlling the retardation of the vehicle, at least a first motion support device in the set of motion support devices being an electric motor and at least a second motion support device in the set of motion support devices being a service brake, the vehicle comprising a set of wheels whereby each motion support device in the set of motion support devices being drivingly connected, directly or indirectly, to one or more of the wheels;

the control system being adapted to use power loss information for each motion support device in the set of motion support devices;

wherein, for each one of the motion support devices, the power loss information is such that, for each one of a plurality of operating points, the power loss information comprises a power loss value indicative of a power loss of the motion support device when operated at the operating point, each operating point being related to at least a load produced by the motion support device;

the control system being adapted to:

receive a vehicle retardation request indicative of a requested retardation of the vehicle;

use the power loss information for each motion support device in the set of motion support devices in order to determine a brake load to be supplied by each motion support device in the set of motion support devices such that the aggregated brake load supplied by the set of motion support devices results in a retardation of the vehicle corresponding to the vehicle retardation request; and issue information to the set of motion support devices indicative of the brake load to be supplied by each motion support device in the set of set of motion support devices.

2. The control system of claim 1, wherein the control system is adapted to use the power loss information for each motion support device in the set of motion support devices in order to determine a brake load to be supplied by each motion support device in the set of motion support devices such that the aggregated brake load supplied by the set of motion support devices results in a retardation of the vehicle corresponding to the vehicle retardation request and such that the aggregated power loss from the set of motion support devices is equal to or lower than an aggregated power loss threshold associated with the vehicle retardation request.

3. The control system of claim 1, wherein the control system is adapted to use the power loss information for each motion support device in the set of motion support devices in order to determine a brake load to be supplied by each motion support device in the set of motion support devices such that the aggregated brake load supplied by the set of motion support devices results in a retardation of the vehicle corresponding to the vehicle retardation request and such that an absolute value of the difference between the aggregated power loss from the set of motion support devices and a minimum value of the aggregated power losses associated with the vehicle retardation request is equal to or below a predetermined difference threshold.

4. The control system of claim 1, wherein the control system comprises a memory adapted to store the power loss information for each motion support device in the set of motion support devices.

5. The control system of claim 1, wherein for the power loss information for at least one, of the motion support devices in the set of motion support devices, each operating point is related to at least a load produced by the motion support device as well as information indicative of a rotational speed of a wheel connected to the motion support device.

6. The control system of claim 1, wherein the first motion support device in the set of motion support devices is an electric motor connected to an energy storage device and for the power loss information for the first motion support device, each operating point is related to at least a load produced by the motion support device as well as information indicative of current state of charge associated with the energy storage device and/or a current maximum charging rate associated with the energy storage device.

7. The control system of claim 1, wherein, for each one of the motion support devices, each operating point is related to at least a load produced by the motion support device as well as information indicative of a current temperature of at least a portion of the motion support device.

8. The control system of claim 1, wherein the load produced by each motion support device is one of the following: a force and a torque.

9. A vehicle comprising a set of motion support devices for controlling the retardation of the vehicle, at least a first motion support device in the set of motion support devices being an electric motor and at least a second motion support device in the set of motion support devices being a service brake, the vehicle comprising a set of wheels whereby each motion support device in the set of motion support devices being drivingly connected, directly or indirectly, to one or more of the wheels, the vehicle comprising the control system of claim 1.

10. A method for controlling a retardation of a vehicle:
the vehicle comprising a set of motion support devices for controlling the retardation of the vehicle, at least a first motion support device in the set of motion support devices being an electric motor and at least a second motion support device in the set of motion support devices being a service brake, the vehicle comprising a set of wheels whereby each motion support device in the set of motion support devices being drivingly connected, directly or indirectly, to one or more of the wheels;
the method comprising using power loss information for each motion support device in the set of motion support devices;
wherein, for each one of the motion support devices, the power loss information is such that, for each one of a plurality of operating points, the power loss information comprises a power loss value indicative of a power loss of the motion support device when operated at the operating point, each operating point being related to at least a load produced by the motion support device;
the method comprising:
receiving a vehicle retardation request indicative of a requested retardation of the vehicle;
using the power loss information for each motion support device in the set of motion support devices in order to determine a brake load to be supplied by each motion support device in the set of motion support devices such that the aggregated brake load supplied by the set of motion support devices results in a retardation of the vehicle corresponding to the vehicle retardation request; and
issuing information to the set of motion support devices indicative of the brake load to be supplied by each motion support device in the set of set of motion support devices.

11. The method of claim 10, wherein the method comprises using the power loss information for each motion support device in the set of motion support devices in order to determine a brake load to be supplied by each motion support device in the set of motion support devices such that the aggregated brake load supplied by the set of motion support devices results in a retardation of the vehicle corresponding to the vehicle retardation request and such that the aggregated power loss from the set of motion support devices is equal to or lower than an aggregated power loss threshold associated with the vehicle retardation request.

12. The method of claim 10, wherein the method comprises using the power loss information for each motion support device in the set of motion support devices in order to determine a brake load to be supplied by each motion support device in the set of motion support devices such that the aggregated brake load supplied by the set of motion support devices results in a retardation of the vehicle corresponding to the vehicle retardation request and such that an absolute value of the difference between the aggregated power loss from the set of motion support devices and a minimum value the aggregated power losses associated with the vehicle retardation request is equal to or below a predetermined difference threshold.

13. The method of claim 10, wherein for the power loss information for at least one of the motion support devices in the set of motion support devices, each operating point is related to at least a load produced by the motion support device as well as information indicative of a rotational speed of a wheel connected to the motion support device.

14. The method of claim 10, wherein the first motion support device in the set of motion support devices is an electric motor connected to an energy storage device and for the power loss information for the first motion support device, each operating point is related to at least a load produced by the motion support device as well as information indicative of current state of charge associated with the energy storage device and/or a current maximum charging rate associated with the energy storage device.

15. The method of claim 10, wherein, for each one of the motion support devices, each operating point is related to at least a load produced by the motion support device as well as information indicative of a current temperature of at least a portion of the motion support device.

16. The method of claim 10, wherein the load produced by each motion support device is one of the following: a force and a torque.

* * * * *